US012780676B2

(12) United States Patent
Zhang et al.

(10) Patent No.: US 12,780,676 B2
(45) Date of Patent: Nov. 3, 2026

(54) METHOD AND DEVICE FOR PRODUCING AMMONIUM BICARBONATE IN AMMONIA-BASED DECARBONIZATION SYSTEM

(71) Applicant: Jiangnan Environmental Protection Group Inc., Grand Cayman (KY)

(72) Inventors: Jun Zhang, Nanjing (CN); Jinyong Wang, Nanjing (CN); Lifang Qi, Beijing (CN); Jing Luo, Nanjing (CN)

(73) Assignee: Jiangnan Environmental Protection Group Inc., Grand Cayman (KY)

( * ) Notice: Subject to any disclaimer, the term of this patent is extended or adjusted under 35 U.S.C. 154(b) by 624 days.

(21) Appl. No.: 18/197,256

(22) Filed: May 15, 2023

(65) Prior Publication Data

US 2023/0373800 A1 Nov. 23, 2023

(30) Foreign Application Priority Data

May 20, 2022 (CN) ......................... 202210553353.9

(51) Int. Cl.
*C01C 1/26* (2006.01)
*C01C 1/28* (2006.01)

(52) U.S. Cl.
CPC . *C01C 1/26* (2013.01); *C01C 1/28* (2013.01)

(58) Field of Classification Search
CPC .. C01C 1/26; C01C 1/28; Y02C 20/40; B01D 53/78; B01D 53/62; B01D 2251/206; B01D 2251/2062; B01D 2257/504
(Continued)

(56) References Cited

U.S. PATENT DOCUMENTS 2,810,627 A 10/1957 Johnstone et al.
3,752,877 A 8/1973 Beavon
(Continued)

FOREIGN PATENT DOCUMENTS

CN 1280032 A 1/2001
CN 201880482 U 6/2001
(Continued)

OTHER PUBLICATIONS

CN114870588A—machine translation (Year: 2026).*
(Continued)

*Primary Examiner* — Huy Tram Nguyen
(74) *Attorney, Agent, or Firm* — Weiss & Arons LLP

(57) ABSTRACT

Device and methods for producing ammonium bicarbonate in an ammonia-based decarbonization system are provided. The device may include a cooling function zone, an ammonium bicarbonate generation zone, a carbon dioxide absorption zone and an ammonia removal function zone. The cooling function zone may remove heat from the decarbonization system. The ammonium bicarbonate generation zone may generate ammonium bicarbonate. The carbon dioxide absorption zone, which may use multi-stage absorption, may absorb carbon dioxide in process gas. The ammonia removal function zone may remove ammonia in decarbonized process gas. Absorbent ammonia for carbon dioxide removal may be mainly fed to the absorption zone. As a result of the zone control of ammonium bicarbonate generation, $CO_2$ absorption and ammonia removal, the efficiency of decarbonization and absorption may be improved, and ammonia escape may be reduced. Meanwhile, carbon dioxide in flue gas can be used for producing ammonium bicarbonate as a nitrogen fertilizer.

18 Claims, 1 Drawing Sheet

(58) Field of Classification Search
USPC .......................................................... 422/187
See application file for complete search history.

(56) References Cited

U.S. PATENT DOCUMENTS

| | | | |
|---|---|---|---|
| 3,983,217 | A | 9/1976 | Muraki et al. |
| 4,250,160 | A | 2/1981 | Eakman |
| 4,294,590 | A | 10/1981 | Linde et al. |
| 4,324,776 | A | 4/1982 | Kim |
| 4,378,977 | A | 4/1983 | Linde et al. |
| 4,552,747 | A | 11/1985 | Goar |
| 4,690,807 | A | 9/1987 | Saleem |
| 5,019,361 | A | 5/1991 | Hakka |
| 5,106,607 | A | 4/1992 | Chopin et al. |
| 5,362,458 | A | 11/1994 | Saleem et al. |
| 5,632,967 | A | 5/1997 | Nasato |
| 6,063,352 | A | 5/2000 | Risse et al. |
| 6,066,304 | A | 5/2000 | Freetly et al. |
| 6,139,807 | A | 10/2000 | Risse et al. |
| 6,221,325 | B1 | 4/2001 | Brown et al. |
| 6,444,185 | B1 | 9/2002 | Nougayrede et al. |
| 6,508,998 | B1 | 1/2003 | Nasato |
| 6,569,398 | B2 | 5/2003 | Fenderson |
| 6,616,908 | B2 | 9/2003 | Watson et al. |
| 6,776,974 | B1 | 8/2004 | Burmaster et al. |
| 6,991,771 | B2 | 1/2006 | Duncan et al. |
| 7,351,392 | B2 | 4/2008 | Chen et al. |
| 7,635,408 | B2 | 12/2009 | Mak et al. |
| 7,648,692 | B2 | 1/2010 | Chow et al. |
| 7,754,471 | B2 | 7/2010 | Chen et al. |
| 7,879,135 | B2 | 2/2011 | Ravikumar et al. |
| 7,910,077 | B2 | 3/2011 | Chow et al. |
| 8,178,070 | B2 | 5/2012 | Wong et al. |
| 8,206,669 | B2 | 6/2012 | Schaffer et al. |
| 8,361,432 | B2 | 1/2013 | Parekh et al. |
| 8,444,943 | B2 | 5/2013 | Lamar |
| 8,545,793 | B2 | 10/2013 | Thielert |
| 8,871,176 | B2 | 10/2014 | Liu et al. |
| 9,370,745 | B2 | 6/2016 | Xu et al. |
| 2003/0175190 | A1 | 9/2003 | Duncan et al. |
| 2007/0248518 | A1 | 10/2007 | Jung et al. |
| 2009/0004070 | A1 | 1/2009 | Chow et al. |
| 2011/0195008 | A1 | 8/2011 | Menzel et al. |
| 2011/0243822 | A1 | 10/2011 | Mortson |
| 2015/0352489 | A1 | 12/2015 | Luo et al. |

FOREIGN PATENT DOCUMENTS

| | | | | |
|---|---|---|---|---|
| CN | 1377722 | A | | 11/2002 |
| CN | 1178735 | C | | 4/2003 |
| CN | 1408464 | A | | 4/2003 |
| CN | 1164480 | C | | 9/2004 |
| CN | 2640584 | Y | | 9/2004 |
| CN | 2640585 | Y | | 9/2004 |
| CN | 2668235 | Y | | 1/2005 |
| CN | 1617831 | A | | 5/2005 |
| CN | 2746971 | Y | | 12/2005 |
| CN | 2746972 | Y | | 12/2005 |
| CN | 2746973 | Y | | 12/2005 |
| CN | 2754711 | Y | | 2/2006 |
| CN | 1251965 | C | | 4/2006 |
| CN | 2772609 | Y | | 4/2006 |
| CN | 2778373 | Y | | 5/2006 |
| CN | 2799059 | Y | | 7/2006 |
| CN | 2799060 | Y | | 7/2006 |
| CN | 1283346 | C | | 11/2006 |
| CN | 1321723 | C | | 6/2007 |
| CN | 101085410 | A | | 12/2007 |
| CN | 201030298 | Y | | 3/2008 |
| CN | 201052456 | Y | | 4/2008 |
| CN | 100395006 | C | | 6/2008 |
| CN | 201109711 | Y | | 9/2008 |
| CN | 100428979 | C | | 10/2008 |
| CN | 201129965 | Y | | 10/2008 |
| CN | 201132102 | Y | | 10/2008 |
| CN | 101352642 | A | | 1/2009 |
| CN | 201179415 | Y | | 1/2009 |
| CN | 100460045 | C | | 2/2009 |
| CN | 100475313 | C | | 4/2009 |
| CN | 101422693 | A | | 5/2009 |
| CN | 201231130 | Y | | 5/2009 |
| CN | 101524620 | | | 9/2009 |
| CN | 201320447 | Y | | 10/2009 |
| CN | 201333376 | Y | | 10/2009 |
| CN | 101575103 | A | | 11/2009 |
| CN | 101579602 | A | * | 11/2009 |
| CN | 101585511 | A | | 11/2009 |
| CN | 201380037 | Y | | 1/2010 |
| CN | 201380038 | Y | | 1/2010 |
| CN | 201380039 | Y | | 1/2010 |
| CN | 201380040 | Y | | 1/2010 |
| CN | 100588608 | C | | 2/2010 |
| CN | 101642629 | A | | 2/2010 |
| CN | 201423237 | Y | | 3/2010 |
| CN | 101274750 | B | | 6/2010 |
| CN | 101745303 | A | | 6/2010 |
| CN | 201492952 | U | | 6/2010 |
| CN | 201529487 | U | | 7/2010 |
| CN | 201529488 | U | | 7/2010 |
| CN | 201537456 | U | | 8/2010 |
| CN | 101830483 | A | | 9/2010 |
| CN | 101274196 | B | | 12/2010 |
| CN | 101182926 | B | | 1/2011 |
| CN | 101519192 | B | | 2/2011 |
| CN | 101579600 | B | | 4/2011 |
| CN | 102000490 | A | | 4/2011 |
| CN | 102012034 | A | | 4/2011 |
| CN | 101456541 | B | | 5/2011 |
| CN | 101576261 | B | | 5/2011 |
| CN | 101579602 | B | | 5/2011 |
| CN | 102061206 | A | | 5/2011 |
| CN | 101274204 | B | | 6/2011 |
| CN | 101670231 | B | | 8/2011 |
| CN | 201912884 | U | | 8/2011 |
| CN | 201912885 | U | | 8/2011 |
| CN | 201944861 | U | | 8/2011 |
| CN | 201949808 | U | | 8/2011 |
| CN | 102205202 | A | | 10/2011 |
| CN | 102380305 | A | | 3/2012 |
| CN | 102381685 | A | | 3/2012 |
| CN | 102381686 | A | | 3/2012 |
| CN | 102423597 | A | | 4/2012 |
| CN | 101791517 | B | | 5/2012 |
| CN | 102451604 | A | | 5/2012 |
| CN | 101456540 | B | | 7/2012 |
| CN | 101574614 | B | | 7/2012 |
| CN | 101637685 | B | | 7/2012 |
| CN | 102631827 | A | | 8/2012 |
| CN | 202460375 | U | | 10/2012 |
| CN | 202460420 | U | | 10/2012 |
| CN | 202460438 | U | | 10/2012 |
| CN | 101530727 | B | | 11/2012 |
| CN | 101955828 | B | | 11/2012 |
| CN | 102211762 | B | | 11/2012 |
| CN | 101972592 | B | | 12/2012 |
| CN | 202538627 | U | | 12/2012 |
| CN | 101934191 | B | | 1/2013 |
| CN | 102049186 | B | | 1/2013 |
| CN | 202725003 | U | | 2/2013 |
| CN | 202751942 | U | | 2/2013 |
| CN | 202754802 | U | | 2/2013 |
| CN | 202829575 | U | | 3/2013 |
| CN | 101418246 | B | | 4/2013 |
| CN | 202912691 | U | | 5/2013 |
| CN | 202924730 | U | | 5/2013 |
| CN | 202953829 | U | | 5/2013 |
| CN | 102381687 | B | | 8/2013 |
| CN | 203159221 | U | | 8/2013 |
| CN | 203264545 | U | | 11/2013 |
| CN | 203291675 | U | | 11/2013 |
| CN | 102489140 | B | | 12/2013 |
| CN | 103418223 | A | | 12/2013 |
| CN | 203329558 | U | | 12/2013 |
| CN | 203612955 | U | | 5/2014 |

(56) References Cited

FOREIGN PATENT DOCUMENTS

| | | | | | |
|---|---|---|---|---|---|
| CN | 102942162 B | | 8/2014 | | |
| CN | 203781842 U | | 8/2014 | | |
| CN | 102910593 B | | 9/2014 | | |
| CN | 102847431 B | | 10/2014 | | |
| CN | 103204477 B | | 10/2014 | | |
| CN | 103446859 B | | 10/2014 | | |
| CN | 104138713 A | | 11/2014 | | |
| CN | 103301732 B | | 1/2015 | | |
| CN | 103041679 B | | 2/2015 | | |
| CN | 103301736 B | | 2/2015 | | |
| CN | 104368231 A | | 2/2015 | | |
| CN | 204134465 U | | 2/2015 | | |
| CN | 204151066 U | | 2/2015 | | |
| CN | 102895870 B | | 3/2015 | | |
| CN | 102923670 B | | 3/2015 | | |
| CN | 204198421 U | | 3/2015 | | |
| CN | 103223292 B | | 4/2015 | | |
| CN | 104555939 A | | 4/2015 | | |
| CN | 204233957 U | | 4/2015 | | |
| CN | 103112831 B | | 5/2015 | | |
| CN | 204352660 U | | 5/2015 | | |
| CN | 103301705 B | | 8/2015 | | |
| CN | 103482583 B | | 9/2015 | | |
| CN | 104923046 A | | 9/2015 | | |
| CN | 104927894 A | | 9/2015 | | |
| CN | 104941423 A | | 9/2015 | | |
| CN | 104946296 A | | 9/2015 | | |
| CN | 103463949 B | | 12/2015 | | |
| CN | 105110819 A | | 12/2015 | | |
| CN | 105126573 A | | 12/2015 | | |
| CN | 104353258 B | | 1/2016 | | |
| CN | 104249995 B | | 4/2016 | | |
| CN | 205235588 U | | 5/2016 | | |
| CN | 205245200 U | | 5/2016 | | |
| CN | 205252720 U | | 5/2016 | | |
| CN | 205252721 U | | 5/2016 | | |
| CN | 205252722 U | | 5/2016 | | |
| CN | 205262780 U | | 5/2016 | | |
| CN | 103822217 B | | 6/2016 | | |
| CN | 105757688 A | | 7/2016 | | |
| CN | 104555940 B | | 8/2016 | | |
| CN | 105841168 A | | 8/2016 | | |
| CN | 104524948 B | | 9/2016 | | |
| CN | 205549846 U | | 9/2016 | | |
| CN | 205562498 U | | 9/2016 | | |
| CN | 103521060 B | | 1/2017 | | |
| CN | 103939918 B | | 1/2017 | | |
| CN | 104208992 B | | 2/2017 | | |
| CN | 104258713 B | | 2/2017 | | |
| CN | 104528659 B | | 4/2017 | | |
| CN | 114870588 A | * | 8/2022 | ............. | B01D 53/78 |
| CN | 114870600 A | * | 8/2022 | ............. | B01D 53/78 |
| DE | 3733319 A1 | | 9/1989 | | |
| EP | 165609 B1 | | 6/1985 | | |
| EP | 212523 A2 | | 3/1987 | | |
| JP | S47-043737 | | 11/1972 | | |
| TW | 497985 | | 8/2002 | | |
| WO | WO200507505 A1 | | 8/2005 | | |
| WO | WO2005113429 A1 | | 12/2005 | | |
| WO | WO2006113935 A2 | | 10/2006 | | |
| WO | WO2012152919 A1 | | 11/2012 | | |

OTHER PUBLICATIONS

CN114870600A—machine translation (Year: 2026).*
Office Action issued in U.S. Appl. No. 14/829,905 on Nov. 16, 2015.
Office Action issued in U.S. Appl. No. 14/829,905 on Feb. 29, 2016.
Office Action issued in U.S. Appl. No. 14/829,909 on Apr. 15, 2016.
Office Action issued in U.S. Appl. No. 14/829,909 on Dec. 14, 2016.
Office Action issued in U.S. Appl. No. 14/829,909 on Feb. 14, 2017.
International Search Report issued for International Application No. PCT/CN2013/074657, Dec. 26, 2013.
International Search Report issued for International Application No. PCT/CN2014/087887, Jan. 14, 2015.
Supplementary European Search Report issued in European Application No. 13882863.7, Mar. 11, 2016.
Google Patents English translation of CN1283346C.
Google Patents English translation of CN2640585Y.
Google Patents English translation of CN2772609Y.
Google Patents English translation of CN100428979C.
Google Patents English translation of CN201912885U.
Google Patents English translation of CN10322392A.
Office Action issued by the Japanese Intellectual Property Office in Japanese Application No. 2017-123088, on Apr. 16, 2018.
"Introduction to FGD for China Shenhua Coal to Liquid(CTL) Project," Jiangnan Environmental Technology, Inc., 19th Annual Electric Power Conference and Exhibition, Apr. 13, 2017, Chicago, Illinois.
"Advantages & Application of Efficient Ammonia-Based Desulfurization Technology," Jiangnan Environmental Technology, Inc., 19th Annual Electric Power Conference and Exhibition, Apr. 13, 2017, Chicago, Illinois.
Wende Xiao and Zhiquan Wu, "Sulfur Dioxide Removal and Recovery," Chemical Industry Press (China), 143-145, May 2001.
Yang Yang, "Sulfur Dioxide Emission Reduction Technology and Flue Gas Desulfurization Project," Metallurgical Industry Press (China), 184-187, Jan. 2004.
Ke Zhang, "Industrial Chemistry," Commercial Press (China), 83-85, Jan. 1958.
Xianxi Ku, "Chemical Technology," Metallurgical Industry Press (China), 37-42, May 1995.
Zhuo Nan and Zengtai Zhao, "Nitrogen Fertilizer Industry," China Industry Press (China) 20-21, Mar. 1964.
Tianqi Liu and Xiaolin Huang, "Three Waste Treatment Engineering Technical Manual (part of Exhaust Gas)," Chemical Industry Press (China), 207-208, May 1999.
Shengli Cao, "Coal Chemical Product Technology," Metallurgical Industry Press (China), 43, Jun. 2003.

* cited by examiner

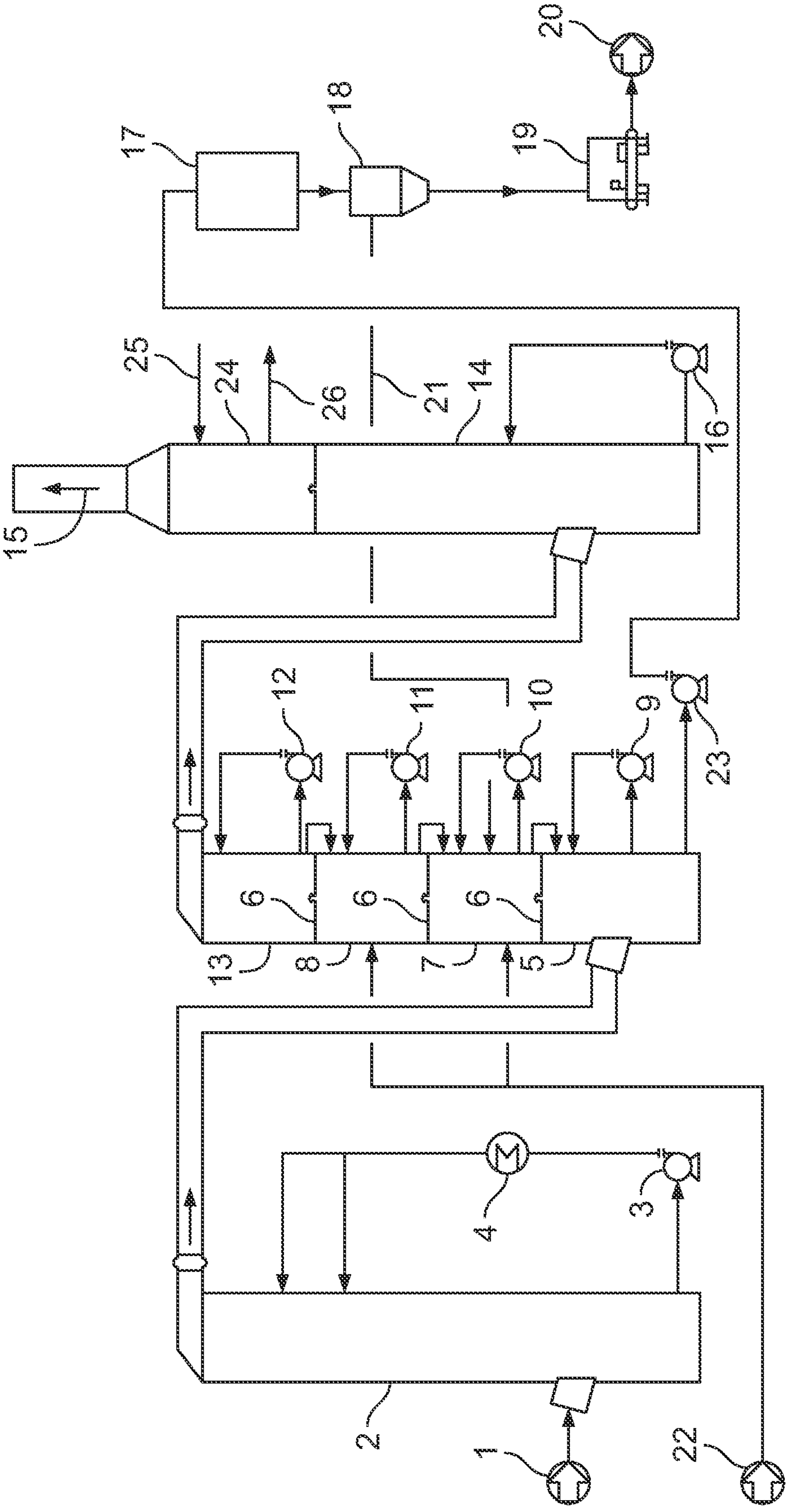
1
2
3
4
5
6
6
6
7
8
9
10
11
12
13
14
15
16
17
18
19
20
21
22
23
24
25
26

METHOD AND DEVICE FOR PRODUCING AMMONIUM BICARBONATE IN AMMONIA-BASED DECARBONIZATION SYSTEM

CROSS-REFERENCE TO RELATED APPLICATION

This application claims priority under 35 U.S.C. § 119 of Chinese Patent Application No. CN202210553353.9, filed on May 20, 2022, which is hereby incorporated in its entirety herein.

TECHNICAL FIELD

This application relates to environmental protection. Specifically, this application relates to a method and device for producing ammonium bicarbonate in an ammonia-based decarbonization system.

BACKGROUND

At present, the efficiency of waste gas treatment in various industrial enterprises is generally low, or the waste gas is discharged into the atmosphere after desulfurization and dust removal treatment, and a large amount of greenhouse gas such as $CO_2$ is discharged into the environment, resulting in a series of environmental problems such as acceleration of global climate warming. Therefore, it is one of the urgent problems for all countries to find a positive and effective $CO_2$ treatment method. Ammonium bicarbonate is a quick-acting nitrogen fertilizer with a molecular formula of $NH_4HCO_3$, which is soluble in water, easy to decompose, and applicable to various crops and various soils. Carbon dioxide is one of the raw materials for the production of ammonium bicarbonate. It would be desirable to process the $CO_2$ in the waste gas streams in the industrial processes and convert it into ammonium bicarbonate. As such, the problem of directly discharging $CO_2$ into the atmosphere can be reduced or eliminated, and ammonium bicarbonate fertilizers can be prepared.

Patent CN201010125082.4 discloses a production method for synthesizing ammonium bicarbonate fertilizers using $CO_2$ waste gas. A process of generating ammonium bicarbonate through countercurrent contact between $CO_2$ waste gas after dust removal and desulfurization of tail gas and concentrated ammonia water is used, ammonia gas in the previous procedure is recovered via an ammonia recovery tower, and the remaining tail gas is directly discharged to the atmosphere. In the process, ammonium bicarbonate can be generated by countercurrent contact between concentrated ammonia water and $CO_2$-containing gas for absorption. However, because the temperature is not lowered, in principle the ammonium bicarbonate generation and $CO_2$ absorption are not controlled individually, the absorption efficiency is low and the ammonia escape is high.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 1 is a schematic flowchart of a device/method according to the principles of the invention.

In FIG. 1, the reference numerals have the following meanings:

1. process gas;
2. cooling function zone;
3. cooling circulating pump;
4. heat exchanger;
5. ammonium bicarbonate generation zone;
6. liquid collector;
7. first-stage carbon dioxide absorption zone;
8. second-stage carbon dioxide absorption zone;
9. ammonium bicarbonate generation zone circulating pump;
10. first-stage carbon dioxide absorption zone circulating pump;
11. second-stage carbon dioxide absorption zone circulating pump;
12. third-stage carbon dioxide absorption zone circulating pump;
13. third-stage carbon dioxide absorption zone;
14. ammonia removal function zone water-washing section;
15. decarbonized gas;
16. ammonia removal function zone water-washing circulating pump;
17. ammonium bicarbonate crystallizer;
18. solid-liquid separator;
19. packing machine;
20. solid ammonium bicarbonate;
21. mother liquid return pipe;
22. ammonia;
23. ammonium bicarbonate discharge pump;
24. ammonia removal function zone acid-washing section;
25. ammonium sulfate solution from ammonia-based desulfurization;
26. solution for ammonia-based desulfurization.

DETAILED DESCRIPTION

Apparatus and methods for producing ammonium bicarbonate in an ammonia-based decarbonization system are provided.

The apparatus may include a cooling function zone. The cooling function zone may be operable to cool process gas. The apparatus may include an ammonium bicarbonate generation zone. The ammonium bicarbonate generation zone may be operable to generate ammonium bicarbonate. The apparatus may include a carbon dioxide absorption zone. The carbon dioxide absorption zone may be operable to absorb, via multi-stage absorption, carbon dioxide from process gas. The apparatus may include an ammonia removal function zone. The ammonia removal function zone may be operable to remove ammonia from decarbonized process gas. The carbon dioxide absorption zone may apply absorbent ammonia to process gas for carbon dioxide removal.

The ammonia bicarbonate generation zone may apply less ammonia to process gas than one or more of the individual stages with the multi-stage absorption zone.

A first-stage within the carbon dioxide absorption zone may apply less ammonia than the immediate next stage to process gas. The first-stage may be subsequent to the ammonium bicarbonate generation zone.

A last-stage decarbonization absorption circulating liquid may apply less ammonia to process gas than a previous stage within the carbon dioxide absorption zone.

A first-stage within the carbon dioxide absorption zone may apply less than 20% of the total ammonia applied to the process gas. The first-stage may be subsequent to the ammonia bicarbonate generation zone.

Solid ammonium bicarbonate may be produced from the ammonium bicarbonate generated in the ammonium bicarbonate generation zone by a post-treatment system. Ammonium bicarbonate mother liquid may be returned to a first-stage within the carbon dioxide absorption zone. The first-stage may be subsequent to the ammonium bicarbonate generation zone.

One or more of the cooling function zone, the ammonium bicarbonate generation zone, the carbon dioxide absorption zone and the ammonia removal function zone may be combined in one or more towers. Equipment/components may be disposed between the function zones to allow the passage of gas.

Methods for producing ammonium bicarbonate in an ammonia-based decarbonization system are provided. The methods may include receiving desulfurized process gas. The methods may include causing the desulfurized process gas to flow, in sequence, through one or more of a cooling function zone, an ammonium bicarbonate generation zone, a multi-stage carbon dioxide absorption zone and an ammonia removal function zone. The cooling function zone may be configured to cool desulfurized process gas. The ammonium bicarbonate generation zone may be configured to generate an ammonium bicarbonate solution/slurry. The multi-stage carbon dioxide absorption zone may be configured to absorb carbon dioxide in desulfurized process gas. The ammonia removal function zone may be configured to remove ammonia in decarbonized process gas. The multi-stage carbon dioxide absorption zone may apply absorbent ammonia to the process gas for carbon dioxide removal.

A first-stage of the multi-stage carbon dioxide absorption zone may be subsequent to the ammonium bicarbonate generation zone. The first-stage may apply less ammonia than the next stage to process gas.

A last-stage decarbonization absorption circulating liquid may apply less ammonia to process gas than a previous stage within the multi-stage carbon dioxide absorption zone.

A first-stage of the multi-stage carbon dioxide absorption zone may be subsequent to the ammonium bicarbonate generation zone. The first-stage may apply less ammonia than the next stage to process gas. The first-stage carbon dioxide absorption zone may apply less ammonia than 20% of the total ammonia applied to process gas.

Solid ammonium bicarbonate may be produced from ammonium bicarbonate generated in the ammonium bicarbonate generation zone by a post-treatment system. Ammonium bicarbonate mother liquid may be returned to a first-stage within the multi-stage carbon dioxide absorption zone. The first-stage may be subsequent to the ammonium bicarbonate generation zone.

The cooling function zone may cool the process gas to a temperature in the range 10-30 degrees Celsius. The cooling function zone may be provided with one or more layers of circulating liquid distributor.

The ammonium bicarbonate generation zone may be provided with one or more layers of gas and liquid distributors. The carbon dioxide absorption zone may be provided with one or more layers of circulating liquid distributors. The ammonia removal function zone may be provided with one or more layers of circulating liquid distributors.

Circulating liquid in a subsequent (relative to the flow direction of flue gas) stage of the multi-stage carbon dioxide absorption zone may flow to a previous stage within the multi-stage carbon dioxide absorption zone. Circulating liquid in a first-stage with in the multi-stage carbon dioxide absorption zone may flow to the ammonium bicarbonate generation zone.

The apparatus may include a device for producing ammonium bicarbonate in an ammonia-based decarbonization system. The device may include one or more of a cooling function zone, an ammonium bicarbonate generation zone, a carbon dioxide absorption zone, and an ammonia removal function zone. The cooling function zone may be configured to cool process gas. The ammonium bicarbonate generation zone may be configured to generate ammonium bicarbonate. The carbon dioxide absorption zone may be configured to absorb carbon dioxide in the process gas using multi-stage absorption. The ammonia removal function zone may be configured to remove ammonia in the decarbonized process gas. Absorbent ammonia for carbon dioxide removal may be mainly fed to the carbon dioxide absorption zone.

As used in the present disclosure, "absorbent ammonia for carbon dioxide removal is mainly fed to the carbon dioxide absorption zone" may be understood to refer to the following: that greater than 60 wt % (weight-percent), e.g., greater than 65 wt %, e.g., greater than 80 wt %, e.g., greater than 90 wt %, e.g., greater than 98 wt %, e.g., 100 wt % of the total absorbent ammonia used for carbon dioxide removal in the method/device may be introduced into the carbon dioxide absorption zone and/or may be fed into the stream of the carbon dioxide absorption zone.

In some embodiments, the ammonium bicarbonate generation zone may be fed with no ammonia.

The first-stage absorption zone subsequent to the ammonium bicarbonate generation zone may be fed with less ammonia than the next stage or no ammonia. The amount of ammonia added in the first-stage carbon dioxide absorption zone subsequent to the ammonium bicarbonate generation zone may be less than 20% of the total ammonia added.

The last-stage decarbonization absorption circulating liquid may be fed with less ammonia than the previous stage or no ammonia. The last-stage decarbonization absorption circulating liquid may be fed with 80 wt % or less, e.g., 50 wt % or less, e.g., 30 wt % or less of ammonia added in the previous-stage decarbonization absorption circulating liquid.

Solid ammonium bicarbonate may be produced from the ammonium bicarbonate generated in the ammonium bicarbonate generation zone by a post-treatment system. Ammonium bicarbonate mother liquid may be returned to the first-stage absorption zone subsequent to the ammonium bicarbonate generation zone.

One or more of the cooling function zone, the ammonium bicarbonate generation zone, the carbon dioxide absorption zone and the ammonia removal function zone may be combined in one or more towers. Equipment/components may be disposed between the function zones to allow the passage of gas.

The methods may include receiving desulfurized process gas. The methods may include causing the process gas to flow, in sequence, through a cooling function zone, an ammonium bicarbonate generation zone, a carbon dioxide absorption zone and an ammonia removal function zone. The cooling function zone may be configured to cool the process gas. The ammonium bicarbonate generation zone may be configured to generate an ammonium bicarbonate solution/slurry. The carbon dioxide absorption zone may be configured to absorb carbon dioxide in the process gas by means of multi-stage absorption. The ammonia removal function zone may be configured to remove ammonia in the decarbonized process gas. Absorbent ammonia for carbon dioxide removal is mainly fed to the carbon dioxide absorption zone.

The first-stage absorption zone subsequent to the ammonium bicarbonate generation zone may be fed with less ammonia than the next stage or no ammonia. The first-stage carbon dioxide absorption zone, subsequent to the ammonium bicarbonate generation zone, may be fed with less ammonia than 20% of the total ammonia fed in the method.

The last-stage decarbonization absorption circulating liquid may be fed with less ammonia than the previous stage or no ammonia. The last-stage decarbonization absorption circulating liquid may be fed with 80 wt % or less, e.g., 50 wt % or less, e.g., 30 wt % or less of ammonia added in the previous-stage decarbonization absorption circulating liquid.

Solid ammonium bicarbonate may be produced from the ammonium bicarbonate generated in the ammonium bicarbonate generation zone by a post-treatment system. Ammonium bicarbonate mother liquid may be returned to the first-stage absorption zone subsequent to the ammonium bicarbonate generation zone.

The cooling function zone may cool the process gas to 10-30° C.

The cooling function zone may be provided with one or more layers of circulating liquid distributor.

The ammonium bicarbonate generation zone may be provided with one or more layers of gas and liquid distributors.

The gas and liquid distributors may be selected from the group consisting of bubble distributors, liquid distribution spray distributors, and combinations thereof.

The carbon dioxide absorption zone may be provided with two or more layers of circulating liquid distributor.

The ammonia removal function zone may be provided with one or more layers of circulating liquid distributor. The circulating liquid may be used in the ammonia removal function zone may be water or an acidic solution.

Circulating liquid in the subsequent-stage carbon dioxide absorption zone may overflow to the previous-stage carbon dioxide absorption zone. Circulating liquid in the first-stage carbon dioxide absorption zone may overflow to the ammonium bicarbonate generation zone.

Those skilled in the art will understand that the embodiments described herein are only for illustrating the disclosure, rather than limiting the scope of the disclosure.

Illustrative embodiments of apparatus and methods in accordance with the principles of the disclosure will now be described with reference to the accompanying drawings, which form a part hereof. It is to be understood that other embodiments may be utilized and that structural, functional and procedural modifications, additions or omissions may be made, and features of illustrative embodiments, whether apparatus or method, may be combined, without departing from the scope and spirit of the disclosure.

An illustrative embodiment of the device/method of the disclosure is described below with reference to the accompanying drawings. $CO_2$-containing process gas 1 after ammonia-based desulfurization first enters a cooling function zone 2. Here, the gas may be brought into countercurrent contact with circulating liquid for cooling, the circulating liquid may be circulated by a cooling circulating pump 3, and the circulating liquid may be cooled by a heat exchanger 4.

The cooled gas enters an ammonium bicarbonate generation zone 5. Here, the gas may be brought into countercurrent contact with the circulating liquid for reaction to generate ammonium bicarbonate, and the circulating liquid may be circulated by a circulating pump 9. The process gas leaving the ammonium bicarbonate generation zone 5 enters a first-stage carbon dioxide absorption zone 7. The first-stage carbon dioxide absorption zone 7 may be separated from the ammonium bicarbonate generation zone 5 by a liquid collector 6 allowing the passage of gas, and circulating liquid in the first-stage carbon dioxide absorption zone 7 flows to the ammonium bicarbonate generation zone 5.

In the first-stage carbon dioxide absorption zone 7, the gas may be brought into countercurrent contact with the circulating liquid for reaction to generate ammonium carbonate or ammonium carbamate, and the circulating liquid is circulated by a circulating pump 10. The first-stage carbon dioxide absorption zone 7 may be separated from a second-stage carbon dioxide absorption zone 8 by the liquid collector 6 allowing the passage of gas, and circulating liquid in the second-stage carbon dioxide absorption zone 8 may flow to the first-stage carbon dioxide absorption zone 7. Mother liquid from the solid-liquid separation of an ammonium bicarbonate post-treatment system may be returned to the first-stage carbon dioxide absorption zone 7.

The gas may enter the second-stage carbon dioxide absorption zone 8 after passing through the first-stage carbon dioxide absorption zone 7. The gas may be brought into countercurrent contact with the circulating liquid for reaction to further generate ammonium carbonate or ammonium carbamate. The circulating liquid may be circulated by a circulating pump 11.

The gas may enter a third-stage carbon dioxide absorption zone 13 after passing through the second-stage carbon dioxide absorption zone 8, the gas may be brought into countercurrent contact with the circulating liquid for reaction to further generate ammonium carbonate or ammonium carbamate, and the circulating liquid may be circulated by a circulating pump 12.

Ammonia 22 may be fed into the first-stage carbon dioxide absorption zone 7 and the second-stage carbon dioxide absorption zone 8 through a pipeline.

The gas after passing through the third-stage carbon dioxide absorption zone 13 may be further treated and then may enter a water-washing and ammonia removal function zone 14 and an acid-washing and ammonia removal function zone 24. Here, the gas is respectively brought into countercurrent contact with water and an acidic ammonium sulfate solution to absorb free ammonia, and the water is circulated by a circulating pump 16. The process gas 15 after ammonia removal may be discharged.

The circulating liquid in the ammonium bicarbonate generation zone 5 may be pumped into an ammonium bicarbonate crystallizer 17 through an ammonium bicarbonate discharge pump 23, and then may enter a solid-liquid separator 18. The obtained solid may be delivered to a packing machine 19 to produce solid ammonium bicarbonate 20. The obtained mother liquid may be returned to the first-stage carbon dioxide absorption zone 7.

Example 1

The device as shown in FIG. 1 was used for Example 1. $CO_2$-containing process gas 1 first entered cooling function zone 2. Here, the process gas was brought into countercurrent contact with circulating liquid for cooling, the circulating liquid was circulated by cooling circulating pump 3, and the circulating liquid was cooled by a heat exchanger 4. The circulating liquid was water, and components entrained by the process gas entered the circulating liquid during the circulation process. The circulating liquid contained components such as ammonium sulfate, a byproduct of previous ammonia-based desulfurization.

The gas cooled to 25° C. entered ammonium bicarbonate generation zone 5. Here, the process gas was brought into countercurrent contact with the circulating liquid for reaction to generate ammonium bicarbonate, and the circulating liquid was circulated by circulating pump 9. The process gas leaving the ammonium bicarbonate generation zone 5 entered first-stage carbon dioxide absorption zone 7. The first-stage carbon dioxide absorption zone 7 was separated from the ammonium bicarbonate generation zone 5 by a liquid collector 6 allowing the passage of gas, and circulating liquid in the first-stage carbon dioxide absorption zone 7 flowed to the ammonium bicarbonate generation zone 5.

In the first-stage carbon dioxide absorption zone 7, the gas was brought into countercurrent contact with the circulating liquid for reaction to generate ammonium carbonate or ammonium carbamate, and the circulating liquid was circulated by a circulating pump 10. The first-stage carbon dioxide absorption zone 7 was separated from a second-stage carbon dioxide absorption zone 8 by the liquid collector 6 allowing the passage of gas, and circulating liquid in the second-stage carbon dioxide absorption zone 8 flowed to the first-stage carbon dioxide absorption zone 7. Mother liquid from the solid-liquid separation of an ammonium bicarbonate post-treatment system was returned to the first-stage carbon dioxide absorption zone 7.

The gas after passing through the first-stage carbon dioxide absorption zone 7 entered the second-stage carbon dioxide absorption zone 8, the gas was brought into countercurrent contact with the circulating liquid for reaction to further generate ammonium bicarbonate or ammonium carbamate, and the circulating liquid was circulated by a circulating pump 11.

The gas after passing through the second-stage carbon dioxide absorption zone 8 entered a third-stage carbon dioxide absorption zone 13, the gas was brought into countercurrent contact with the circulating liquid for reaction to further generate ammonium bicarbonate or ammonium carbamate, and the circulating liquid was circulated by a circulating pump 12.

Ammonia 22 was fed into the first-stage carbon dioxide absorption zone 7 and the second-stage carbon dioxide absorption zone 8 through a pipeline. The amount of ammonia fed in the first-stage was 10%, and the amount of ammonia fed in the second stage was 90%.

The gas after passing through the second-stage carbon dioxide absorption zone 8 entered a water-washing and ammonia removal function zone 14 and acid-washing and ammonia removal function zone 24. Here, the gas was respectively brought into countercurrent contact with water and an ammonium sulfate solution to absorb free ammonia, and the water was circulated by circulating pump 16. The process gas 15 after ammonia removal was discharged. The water-washing and ammonia removal function zone 14 contained water. Components entrained in the process gas entered the circulating liquid during the circulation process. The circulating liquid contained components such as ammonium bicarbonate, a byproduct of previous ammonia-based decarbonization.

The circulating liquid in the ammonium bicarbonate generation zone 5 was pumped into an ammonium bicarbonate crystallizer 17 through an ammonium bicarbonate discharge pump 23, and then entered a solid-liquid separator 18. The obtained solid was delivered to a packing machine 19 to produce solid ammonium bicarbonate 20. The obtained mother liquid was returned to the first-stage carbon dioxide absorption zone 7.

The decarbonization used 99.6% anhydrous ammonia as absorbent, and the parameters of process gas 1 are shown in the following table:

| No. | Item | Value |
|---|---|---|
| 1 | Gas flow, $Nm^3/h$ | 88500 |
| 2 | Temperature, ° C. | 45 |
| 3 | $SO_2$ content, $mg/Nm^3$ | 35 |
| 4 | $CO_2$ content, v % (volume-percent) | 12.0 |
| 5 | $NH_3$ content, ppm | 3 |

The parameters of the cooled flue gas are shown in the following table:

| No. | Item | Value |
|---|---|---|
| 1 | Gas flow, $Nm^3/h$ | 78710 |
| 2 | Temperature, ° C. | 18 |
| 3 | $SO_2$ content, $mg/Nm^3$ | 35 |
| 4 | $CO_2$ content, v % | 13.5 |
| 5 | $NH_3$ content, ppm | 3 |

The main parameters obtained after treatment by decarbonization absorption tower are shown in the following table:

| No. | Item | Value |
|---|---|---|
| 1 | Gas flow at outlet of decarbonization absorption tower, $Nm^3/h$ | 75333 |
| 2 | $CO_2$ content at outlet of decarbonization absorption tower, v % | 5.26 |
| 3 | $NH_3$ content at outlet of decarbonization absorption tower, ppm | 1000 |
| 4 | Decarbonization efficiency, % | 60 |
| 5 | Amount of byproduct ammonium bicarbonate, t/h | 22.5 |
| 6 | 99.6% anhydrous ammonia consumption, t/h | 4.86 |

The main parameters obtained after treatment by ammonia washing tower may be shown in the following table:

| No. | Item | Value |
|---|---|---|
| 1 | Gas flow at outlet of ammonia washing tower, $Nm^3/h$ | 77754 |
| 2 | $CO_2$ content at outlet of ammonia washing tower, v % | 5.26 |
| 3 | $NH_3$ content at outlet of ammonia washing tower, ppm | 10 |
| 4 | $SO_2$ content at outlet of ammonia washing tower, ppm | 5 |

Comparative Example

Compared with Example 1, only the amounts of ammonia fed are different. Ammonia was fed to the ammonium bicarbonate generation zone and the first-, second- and third-stage decarbonization absorption zones, and the amounts of ammonia fed to the four stages were equivalent.

Since the amounts of ammonia fed in the ammonium bicarbonate generation zone reached 25%, ammonium bicarbonate was not generated in the solution and ammonium bicarbonate crystals were not obtained. The amount of ammonia fed to the third-stage decarbonization absorption zone reached 25%, which increased the decarbonization ammonia escape. The ammonia escape of the process gas treated by the decarbonization absorption zone 6 reached 6000 ppm. Accordingly, the ammonia removal loads in the subsequent water-washing ammonia removal function zone 14 and acid-washing ammonia removal function zone 24 were increased.

The main parameters of gas obtained after decarbonization treatment are shown in the following table:

| No. | Item | Value |
|---|---|---|
| 1 | Gas flow at outlet of decarbonization absorption tower, $Nm^3/h$ | 77339 |
| 2 | $CO_2$ content at outlet of decarbonization absorption tower, v % | 8.11 |
| 3 | $NH_3$ content at outlet of decarbonization absorption tower, ppm | 6000 |
| 4 | $SO_2$ content at outlet of decarbonization absorption tower, $mg/Nm^3$ | 5 |
| 5 | Decarbonization efficiency, % | 40 |
| 6 | Amount of byproduct ammonium bicarbonate, t/h | 15.0 |
| 7 | 99.6% anhydrous ammonia consumption, t/h | 3.59 |

The apparatus and methods may include one or more of the following non-limiting aspects:

1. A device for producing ammonium bicarbonate in an ammonia-based decarbonization system, comprising a cooling function zone, an ammonium bicarbonate generation zone, a carbon dioxide absorption zone, and an ammonia removal function zone, wherein:
   - the cooling function zone is configured to cool process gas;
   - the ammonium bicarbonate generation zone is configured to generate ammonium bicarbonate;
   - the carbon dioxide absorption zone is configured to absorb carbon dioxide in the process gas by means of multi-stage absorption;
   - the ammonia removal function zone is configured to remove ammonia in the decarbonized process gas; and
   - absorbent ammonia for carbon dioxide removal is mainly fed from the carbon dioxide absorption zone.

2. The device according to aspect 1, wherein the ammonium bicarbonate generation zone is fed with less ammonia than the subsequent stage or no ammonia.

3. The device according to aspect 1, wherein the first-stage carbon dioxide absorption zone subsequent to the ammonium bicarbonate generation zone is fed with less ammonia than the next stage or no ammonia and/or the last-stage decarbonization absorption circulating liquid is fed with less ammonia than the previous stage or no ammonia; preferably, the first-stage carbon dioxide absorption zone subsequent to the ammonium bicarbonate generation zone is fed with less ammonia than 20% of the total ammonia fed.

4. The device according to aspect 1, wherein solid ammonium bicarbonate is produced from the ammonium bicarbonate generated in the ammonium bicarbonate generation zone by a post-treatment system, and ammonium bicarbonate mother liquid is returned to the first-stage absorption zone subsequent to the ammonium bicarbonate generation zone.

5. The device according to aspect 1, wherein the cooling function zone, the ammonium bicarbonate generation zone, the carbon dioxide absorption zone, and the ammonia removal function zone are combined in one or more towers, equipment/components being disposed between the function zones to allow the passage of gas.

6. A method for producing ammonium bicarbonate in an ammonia-based decarbonization system, comprising: receiving desulfurized process gas and causing the process gas to flow through a cooling function zone, an ammonium bicarbonate generation zone, a carbon dioxide absorption zone, and an ammonia removal function zone in sequence, wherein:
   - the cooling function zone is configured to cool the process gas;
   - the ammonium bicarbonate generation zone is configured to generate an ammonium bicarbonate solution/slurry;
   - the carbon dioxide absorption zone is configured to absorb carbon dioxide in the process gas by means of multi-stage absorption; and
   - the ammonia removal function zone is configured to remove ammonia in the decarbonized process gas,
   - wherein absorbent ammonia for carbon dioxide removal is mainly fed from the carbon dioxide absorption zone.

7. The method according to aspect 6, wherein the first-stage absorption zone subsequent to the ammonium bicarbonate generation zone is fed with less ammonia than the next stage or no ammonia and/or the last-stage decarbonization absorption circulating liquid is fed with less ammonia than the previous stage or no ammonia; preferably, the first-stage carbon dioxide absorption zone subsequent to the ammonium bicarbonate generation zone is fed with less ammonia than 20% of the total ammonia fed.

8. The method according to aspect 6, wherein solid ammonium bicarbonate is produced from the ammonium bicarbonate generated in the ammonium bicarbonate generation zone by a post-treatment system, and ammonium bicarbonate mother liquid is returned to the first-stage absorption zone subsequent to the ammonium bicarbonate generation zone.

9. The method according to aspect 6, wherein the cooling function zone cools the process gas to 10-30° C.

10. The method according to aspect 6, wherein the cooling function zone is provided with at least one layer of circulating liquid distributor.

11. The method according to aspect 6, wherein the ammonium bicarbonate generation zone is provided with at least one layer of gas and liquid distributors.

12. The method according to aspect 11, wherein the gas and liquid distributors are selected from the group consisting of bubble distributors, liquid distribution spray distributors, and combinations thereof.

13. The method according to aspect 6, wherein the carbon dioxide absorption zone is provided with at least one layer of circulating liquid distributor.

14. The method according to aspect 6, wherein the ammonia removal function zone is provided with at least one layer of circulating liquid distributor.

15. The method according to aspect 6, wherein in the flow direction of flue gas, circulating liquid in the subsequent-stage carbon dioxide absorption zone flows to the previous-stage carbon dioxide absorption zone, and circulating liquid in the first-stage carbon dioxide absorption zone flows to the ammonium bicarbonate generation zone.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 9.4, 3 to 8, 4 to 7), and to each number 1, 2, 3, 4, 5, 6, 7, 8, 9, and 10 contained within the range.

Thus, methods and devices for producing ammonium bicarbonate in an ammonia-based decarbonization system have been provided. Persons skilled in the art will appreciate that the disclosure may be practiced by other than the described embodiments, which are presented for purposes of illustration rather than of limitation. The disclosure is limited only by the claims that follow.

What is claimed is:

1. An apparatus for producing ammonium bicarbonate in an ammonia-based decarbonization system, the apparatus comprising:

a cooling function zone operable to cool process gas;

an ammonium bicarbonate generation zone operable to generate ammonium bicarbonate;

a carbon dioxide absorption zone operable to absorb, via multi-stage absorption, carbon dioxide from process gas; and an ammonia removal function zone operable to remove ammonia from decarbonized process gas;

wherein the carbon dioxide absorption zone applies absorbent ammonia to process gas for carbon dioxide removal.

2. The apparatus of claim 1 wherein the ammonium bicarbonate generation zone applies less ammonia to process gas than one or more stages with the multi-stage absorption zone.

3. The apparatus of claim 1 wherein a first-stage within the carbon dioxide absorption zone, said first-stage being subsequent to the ammonium bicarbonate generation zone, applies less ammonia than an immediate next stage to process gas.

4. The apparatus of claim 1 wherein a last-stage decarbonization absorption circulating liquid applies less ammonia to process gas than a previous stage within the carbon dioxide absorption zone.

5. The apparatus of claim 1 wherein a first-stage within the carbon dioxide absorption zone, said first-stage being subsequent to the ammonium bicarbonate generation zone, applies less than 20% of the total ammonia applied to process gas.

6. The apparatus of claim 1 wherein:

solid ammonium bicarbonate is produced from the ammonium bicarbonate generated in the ammonium bicarbonate generation zone by a post-treatment system; and ammonium bicarbonate mother liquid is returned to a first-stage within the carbon dioxide absorption zone, said first-stage being subsequent to the ammonium bicarbonate generation zone.

7. The apparatus of claim 1 wherein the cooling function zone, the ammonium bicarbonate generation zone, the carbon dioxide absorption zone, and the ammonia removal function zone are combined in one or more towers, equipment/components being disposed between the function zones to allow the passage of gas.

8. A method for producing ammonium bicarbonate in an ammonia-based decarbonization system, the method comprising:

receiving desulfurized process gas;

causing desulfurized process gas to flow, in sequence, through:

a cooling function zone configured to cool desulfurized process gas;

an ammonium bicarbonate generation zone configured to generate an ammonium bicarbonate solution/slurry;

a multi-stage carbon dioxide absorption zone configured to absorb carbon dioxide in desulfurized process gas; and an ammonia removal function zone configured to remove ammonia in decarbonized process gas;

wherein the multi-stage carbon dioxide absorption zone applies absorbent ammonia to the process gas for carbon dioxide removal.

9. The method of claim 8 wherein:

a first-stage of the multi-stage carbon dioxide absorption zone is subsequent to the ammonium bicarbonate generation zone; and the first-stage applies less ammonia than an immediate next stage to process gas.

10. The method of claim 8 wherein a last-stage decarbonization absorption circulating liquid applies less ammonia to process gas than a previous stage within the multi-stage carbon dioxide absorption zone.

11. The method of claim 8 wherein:

a first-stage of the multi-stage carbon dioxide absorption zone is subsequent to the ammonium bicarbonate generation zone;

the first-stage applies less ammonia than an immediate next stage to process gas; and the first-stage carbon dioxide absorption zone applies less ammonia than 20% of the total ammonia applied to process gas.

12. The method of claim 8 wherein:

solid ammonium bicarbonate is produced from ammonium bicarbonate generated in the ammonium bicarbonate generation zone by a post-treatment system; and ammonium bicarbonate mother liquid is returned to a first-stage within the multi-stage carbon dioxide absorption zone, said first-stage being subsequent to the ammonium bicarbonate generation zone.

13. The method of claim 8 wherein the cooling function zone cools the process gas to 10-30° C.

14. The method of claim 8 wherein the cooling function zone is provided with at least one layer of circulating liquid distributor.

15. The method of claim 8 wherein the ammonium bicarbonate generation zone is provided with at least one layer of gas and liquid distributors.

16. The method of claim 8 wherein the carbon dioxide absorption zone is provided with at least one layer of circulating liquid distributor.

17. The method of claim 8 wherein the ammonia removal function zone is provided with at least one layer of circulating liquid distributor.

18. The method of claim 8 wherein:

in the flow direction of flue gas, circulating liquid in a subsequent-stage of the multi-stage carbon dioxide absorption zone flows to a previous-stage within the multi-stage carbon dioxide absorption zone; and circulating liquid in a first-stage within the multi-stage carbon dioxide absorption zone flows to the ammonium bicarbonate generation zone.

* * * * *